United States Patent [19]

Sallstrom et al.

[11] Patent Number: 5,715,664
[45] Date of Patent: Feb. 10, 1998

[54] ALL WHEEL HYDRAULIC DRIVE SYSTEM

[75] Inventors: Steve A. Sallstrom, Minnetonka; Gerald E. Goman, Bloomington; Joel M. Dunlap, Eden Prairie, all of Minn.

[73] Assignee: The Toro Company, Minneapolis, Minn.

[21] Appl. No.: 677,296

[22] Filed: Jul. 9, 1996

Related U.S. Application Data

[62] Division of Ser. No. 192,022, Feb. 3, 1994, Pat. No. 5,533,325.

[51] Int. Cl.$^6$ ..................... A01D 34/60
[52] U.S. Cl. ............. 56/7; 56/11.8; 56/11.9; 180/212; 180/242
[58] Field of Search ............ 56/7, 11.4, 10.8, 56/11.8, 11.9, 6, 249; 180/307, 212, 242

[56] References Cited

U.S. PATENT DOCUMENTS

| | | |
|---|---|---|
| 2,942,677 | 6/1960 | Gray. |
| 3,712,404 | 1/1973 | Walquist. |
| 4,157,125 | 6/1979 | Bushell et al. ............ 180/26 A |
| 4,180,138 | 12/1979 | Shea .................... 180/65 A |
| 4,199,923 | 4/1980 | Blake ................... 56/14.5 |
| 4,369,855 | 1/1983 | Buschbom et al. .......... 180/212 |
| 4,606,428 | 8/1986 | Giere .................... 180/307 |
| 4,864,805 | 9/1989 | Hager et al. ............. 56/11.9 |
| 4,986,387 | 1/1991 | Thompson et al. .......... 180/212 |
| 5,042,236 | 8/1991 | Lamusqa et al. ........... 56/7 |
| 5,199,525 | 4/1993 | Schueler ................. 180/242 |
| 5,427,195 | 6/1995 | Paul et al. .............. 180/242 X |
| 5,607,027 | 3/1997 | Puett, Jr. ............... 180/242 |

FOREIGN PATENT DOCUMENTS

| | | |
|---|---|---|
| 324970 | 7/1989 | European Pat. Off. |
| 2670441 | 6/1992 | France. |
| 1555065 | 1/1975 | Germany. |
| 791903 | 3/1958 | United Kingdom. |

OTHER PUBLICATIONS

Toro Greensmaster 3100 Brochure. (date unknown).
Toro Reelmaster 216 Brochure. (date unknown).
Toro Reelmaster 3500-D Brochure. (date unknown).

*Primary Examiner*—Terry Lee Melius
*Attorney, Agent, or Firm*—James W. Miller

[57] ABSTRACT

An improved hydraulic drive system is provided for a vehicle having a plurality of ground engaging wheels which are each individually driven by a hydraulic motor to provide all wheel drive. The ground engaging wheels include a first pair of such wheels at or adjacent a first end of the vehicle and at least one other such wheel at or adjacent a second end of the vehicle. The hydraulic drive system includes a hydraulic flow circuit that connects the hydraulic motors for the wheel(s) at the second end of the vehicle in series to each other, to the fluid source, and to the drive motors for the wheels at the first end of the frame, which latter drive motors are connected in parallel to each other. Such a vehicle will provide superior traction ability as at least one wheel on each end of the vehicle must slip to bring the vehicle to a halt.

16 Claims, 4 Drawing Sheets

ALL WHEEL HYDRAULIC DRIVE SYSTEM

This application is a division of application Ser. No. 08/192,022, filed Feb. 3, 1994, now U.S. Pat. No. 5,533,325.

TECHNICAL FIELD

This invention relates to a hydraulic drive system for a vehicle having all of its wheels driven by separate hydraulic drive motors. More particularly, this invention relates to such a drive system applied to specialized vehicles, such as riding greens mowers, riding fairway mowers, etc., for operating on turf, grass or the like.

BACKGROUND OF THE INVENTION

Greens mowers are well known machines used for cutting grass to extremely low heights of cut. As such, they are used primarily for cutting grass on golf greens and the like. Typical greens mowers have a plurality of reel type cutting units carried on a frame with the frame being supported by ground engaging wheels. Greens mowers come in both walk behind and riding versions. The Toro Company of Minneapolis, Minn., is a well known manufacturer of such greens mowers.

Many riding greens mowers built by The Toro Company have a three wheel or tricycle configuration. In other words, the frame of the vehicle is supported by three ground engaging wheels comprising two front drive wheels and a single, steerable rear wheel spaced between and set rearwardly from the two front drive wheels. The frame carries an engine in the rear located generally over the rear wheel, a seat for the operator, and a steering wheel for allowing the operator to turn the rear wheel to guide the greens mower.

In addition, the greens mower frame typically carries three reel type cutting units also arranged in a tricycle configuration. Two front cutting units are placed in advance of the front drive wheels with a third, center cutting unit being arranged rearwardly of and in the center of the frame behind the two front cutting units. The Greensmaster 3100 built and sold by The Toro Company is a typical greens mower of this type.

The Toro Company also builds other riding mowers which are quite similar to greens mowers, but are adapted to mowing other portions of a golf course, e.g. fairways, tees and the like. One such vehicle is the Reelmaster 216 which is also built and sold by Toro. Like the Greensmaster 3100, the Reelmaster 216 is a three wheel vehicle with three reel type cutting units arranged at the front of the machine.

Some differences do exist between fairway mowing units and greens mowers. For example, the Reelmaster 216 has a front mounted as opposed to a rear mounted engine. Another difference relates to the type of tires used on the wheels. A greens mower cannot risk marring or scuffing the surface of the greens and, thus, uses bald tires without any tread. However, such tires have relatively poor traction. A fairway mower, such as the Reelmaster 216, would use treaded tires.

Riding mowers of the type just described are often powered by hydraulic drive systems. Such systems include individual hydraulic drive motors applied to selected ones of the drive wheels and driven by a conventional hydraulic variable speed pump. In many greens mowers, including the Greensmaster 3100, just the front drive wheels are driven to provide a two wheel drive. However, in other cases such as in the Reelmaster 216, at least one version of this product is sold in which all three of the drive wheels can be driven to provide three wheel drive. Three or all wheel drive generally provides superior traction.

One difficulty faced by these types of products, and particularly with greens mowers, is a tendency for these products to have at least one of the drive wheels slip, and thus lose traction, under various operational conditions. This will bring the vehicle to a halt, requiring the operator to back the vehicle up or perform some other maneuver to regain traction and regain the ability to drive. This is a major annoyance while mowing especially if it happens frequently. It cuts down on the productivity of the mower requiring that a longer time be spent mowing a particular area of grass.

The tendency for drive wheel slippage in such vehicles is brought about, in part, by their unusual geometry and weight distribution as well as by the environmental conditions they encounter while operating. These mowers, particularly mowers like the Reelmaster 216, are often used to mow quite hilly areas, e.g. the hills and swales in the fairways or around greens, bunkers, tees and the like. Often, they traverse the hill in a sideways or diagonal fashion with the uphill drive wheel carrying little of the vehicle's weight. The grass is often wet and thus relatively slick. In addition, when making a cutting swath across the hill, the cutting units will be placed down on the ground so that their weight is not being carried by the vehicle frame but by the ground.

Given the relatively small overall weight of the unit to begin with, the uphill wheel in this scenario will often slip and lose traction, bringing the unit to a halt. The operator then has to somehow maneuver the unit, by backing it up or allowing it to roll back down the hill, to regain traction. The disadvantages of this are apparent as discussed above.

As noted earlier, the Reelmaster 216 is sold in a three wheel drive version which offers better traction than the two wheel drive version. However, the hydraulic drive system for this vehicle connects all of the wheel drive motors in parallel to the source of the pressurized fluid, i.e. to the hydraulic pump. This is done in part to provide a natural differential action to allow the various wheels to turn at different speeds during a turn. However, in such a drive system, when any one wheel starts to slip, the system naturally tends to supply more fluid to the slipping wheel motor, thus reducing the tractive effort from the other drive wheels. Thus, even in the known three wheel drive versions of the Reelmaster 216, when one of the front drive wheels starts to slip, generally the uphill wheel during a diagonal traverse across a hill, the unit will still come to a stop.

One might think that a hydraulically driven greens mower, which ostensibly mows just the surface of a golf green, would be less likely to encounter wheel slippage conditions than a product like the Reelmaster 216 which is meant to mow more hilly areas of the golf course. However, the reverse is generally true with wheel slippage often being a more acute problem in a greens mower. This is due primarily to the less favorable weight distribution in a greens mower, arising from the use of a rear mounted engine that is not located over the front drive wheels, to the use of a two wheel drive system, and to the use of bald tires which have no traction enhancing tread. It is also due to the fact that such greens mowers are not immune from having to traverse hilly areas.

For example, it is common when cutting a golf green with a riding greens mower to make a first cutting swath across the green, to turn around in a tight circle off the surface of the green, and to then come back and make a second cutting swath across the green which is immediately adjacent to the first swath but in an opposite direction. During the time when the operator is turning the greens mower around, i.e. after having finished the first cutting swath and preparatory to making the second swath, he or she is often turning in a tight circle immediately adjacent the green. Many golf greens have hills or valleys in this area such that the greens mower often has to drive up or across a hill when turning around. This is when a greens mower is most likely to, and often does, lose traction on the uphill wheel and come to a stop.

In addition, many golf greens today are quite sculptured and may have different elevational levels or steps. Typical greens mowers may not be able to climb such steps. This may require that the stepped portion of the green be mowed with a walk behind greens mower, which is obviously less efficient than being able to simply mow the whole green with a riding greens mower. Other golf greens may be so steeply inclined that a conventional greens mower may not be able to drive up the incline of the green. Such greens can only be mowed in one direction, namely downhill, requiring that the operator drive around the outside of the green after each cutting swath to reposition the greens mower above the green before the next cutting swath. This is obviously a time consuming, and thus undesirable, process.

SUMMARY OF THIS INVENTION

One aspect of this invention is to provide a hydraulic drive system for a riding turf vehicle that improves the traction of the vehicle to prevent or reduce the instances of vehicle stoppage due to drive wheel slippage and consequent loss of traction.

These and other aspects of this invention are provided by a hydraulically driven vehicle having all wheel drive. The vehicle comprises a frame having a power source thereon for supplying power. A plurality of ground engaging wheels are attached to the frame for movably supporting the frame for movement over the ground, the wheels comprising a first pair of wheels carried adjacent a first end of the frame and at least one wheel spaced on the frame from the first pair of wheels carried adjacent a second end of the frame. A hydraulic drive system is provided for driving the ground engaging wheels of the frame. This drive system comprises a source of pressurized fluid and individual hydraulic drive motors operatively engaged to each of the ground engaging wheels of the frame. The drive system also includes means for connecting the hydraulic motors to the source of pressurized fluid in the following manner: the wheel drive motor(s) for the wheel(s) on the second end of the frame are connected in series to each other, to the fluid source, and to the wheel drive motors on the first end of the frame, and the wheel drive motors on the first end of the frame are connected to each other in parallel.

BRIEF DESCRIPTION OF THE DRAWINGS

This invention will be described more completely in the following Detailed Description, when taken in conjunction with the following drawings, in which like referenced numerals refer to like elements throughout.

DETAILED DESCRIPTION

Figure 1:
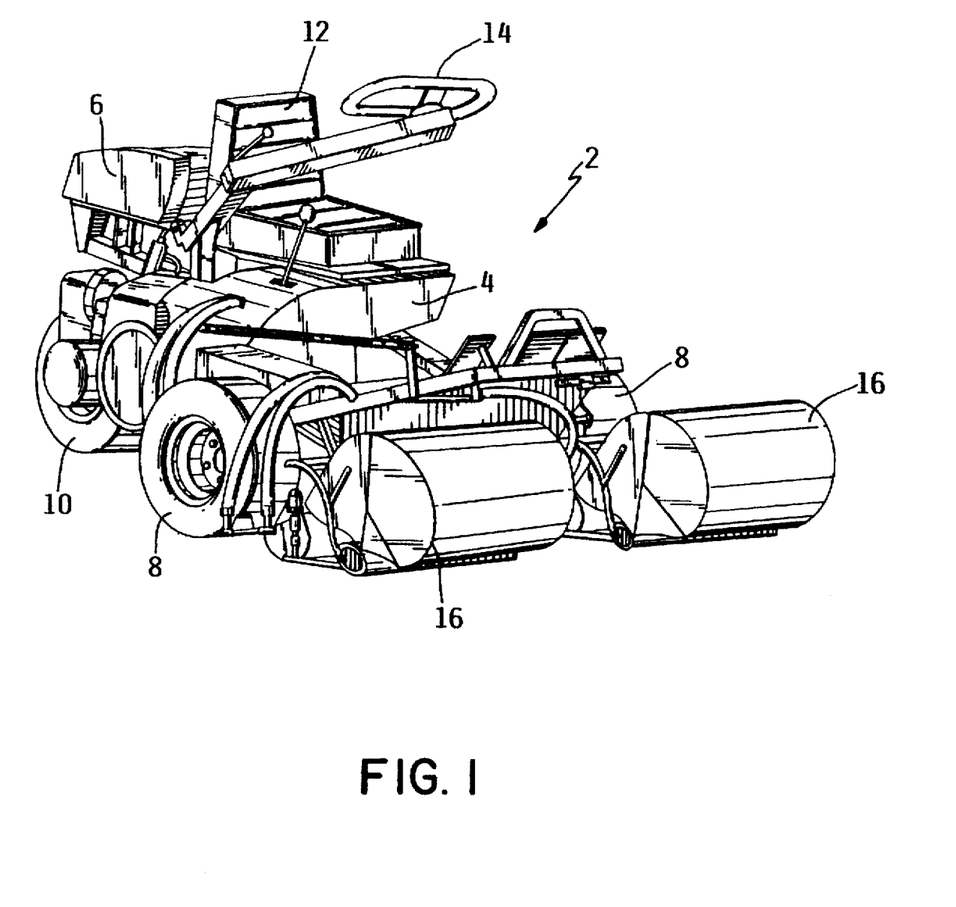
FIG. 1 is a perspective view of a typical riding vehicle to which the hydraulic drive system of this invention may be applied, such vehicle comprising a riding greens mower.

Referring first to FIG. 1, a typical riding vehicle of the type to which this invention may be applied is shown as 2. Vehicle 2 comprises a riding greens mower, such as the Greensmaster 3100, Which is built and sold by The Toro Company, the assignee of this invention. This invention, which relates to a hydraulic drive system for vehicle 2, is particularly well suited for use on vehicles, such as a greens mower, designed to operate on grass, turf or the like. However, this invention is not limited for use on a turf vehicle, but may be used on any hydraulically driven vehicle in which wheel slippage and loss of traction is a significant problem.

By way of background, vehicle 2 comprises a frame 4, a rear mounted engine 6, and three wheels for supporting frame 4 for movement over the ground—namely two front wheels 8 and a rear wheel 10 carried on frame 4 in a tricycle configuration. Frame 4 includes a seat 12 for supporting an operator, a steering wheel 14 for allowing the operator to turn and guide vehicle 2, and linkages (not shown) for connecting rear wheel 10 to steering wheel 14 such that rear wheel 10 is steered by manipulation of steering wheel 14. Vehicle 2 further includes a plurality of reel type cutting units comprising two front cutting units 16 mounted in front of the two front wheels 8. A center, rear cutting unit (not shown) is usually mounted on frame 4 between and behind front cutting units 16. As is true for most greens mowers, the tires on all of the wheels 8 and 10 of frame 4 are supplied without any tread, namely they are "bald", to prevent marring or scuffing of the golf green during mowing.

Figure 2:
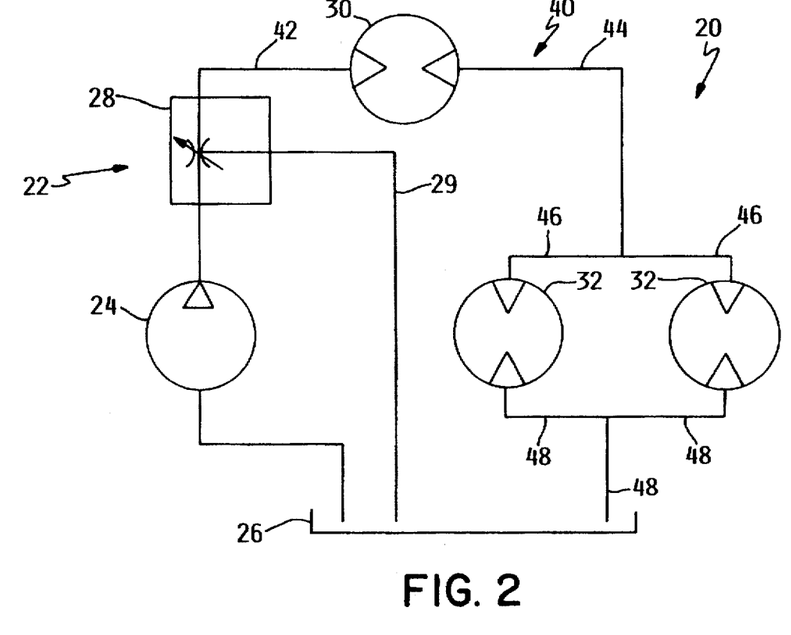
FIG. 2 is a schematic view of a first embodiment of a hydraulic drive system according to this invention as applied to a three wheel vehicle.

Referring now to FIG. 2, a first embodiment of a hydraulic drive system according to this invention is diagrammatically illustrated as 20. Drive system 20 includes a source 22 of pressurized fluid comprising a hydraulic pump 24 of any suitable design which pumps fluid from a reservoir 26. Pump 24 is driven, either directly or indirectly, from engine 6 of vehicle 2.

As shown in FIG. 2, pump 24 can be a pump having a fixed output, such as the Model 49911-23 pump manufactured by Dan-Foss, Inc. An infinitely variable, flow control valve 28 having a return line 29 to reservoir 26 can be used to regulate or control the pressure of the fluid downstream from valve 28. This flow control valve 28 can be connected in some fashion to controls on vehicle 2, e.g. to a foot pedal or the like, to allow the operator to control the speed of vehicle 2 by regulating the pressure of the fluid in hydraulic drive system 20. Rather than using a pump 24 with a fixed output and separate flow control valve 28, a pump 24 having an infinitely variable output could be used.

Hydraulic drive system 20 of this invention comprises individual hydraulic drive motors applied to each of the three wheels of vehicle 2. Thus, referring to FIG. 2, the drive motor for rear wheel 10 is illustrated as 30 and the drive motor attached to each front wheel 8 is illustrated as 32. These drive motors may be any conventional hydraulic drive motors known in the art. For example, drive motor 30 may comprise a Ross Model ME210238EEEB motor manufactured by Parker-Hannifin, and drive motors 32 may comprise Ross Model MB100208AACG motors also manufactured by Parker-Hannifin.

In addition, hydraulic drive system 20 of this invention includes a unique hydraulic flow circuit, indicated generally as 40 in FIG. 2, for connecting drive motors 30, 32 to the pressurized fluid source 22, namely to the pump/flow control valve combination. Circuit 40 comprises fluid supply lines 42, 44 which connect rear wheel drive motor 30 in series both to fluid source 22 and to front wheel drive motors 32. In addition, front wheel drive motors 32 are then connected to each other in parallel as represented by the fluid supply lines 46. Suitable return lines 48 then extend from the outputs of front wheel drive motors 32 to reservoir 26 to return the fluid to reservoir 26.

Figure 6:
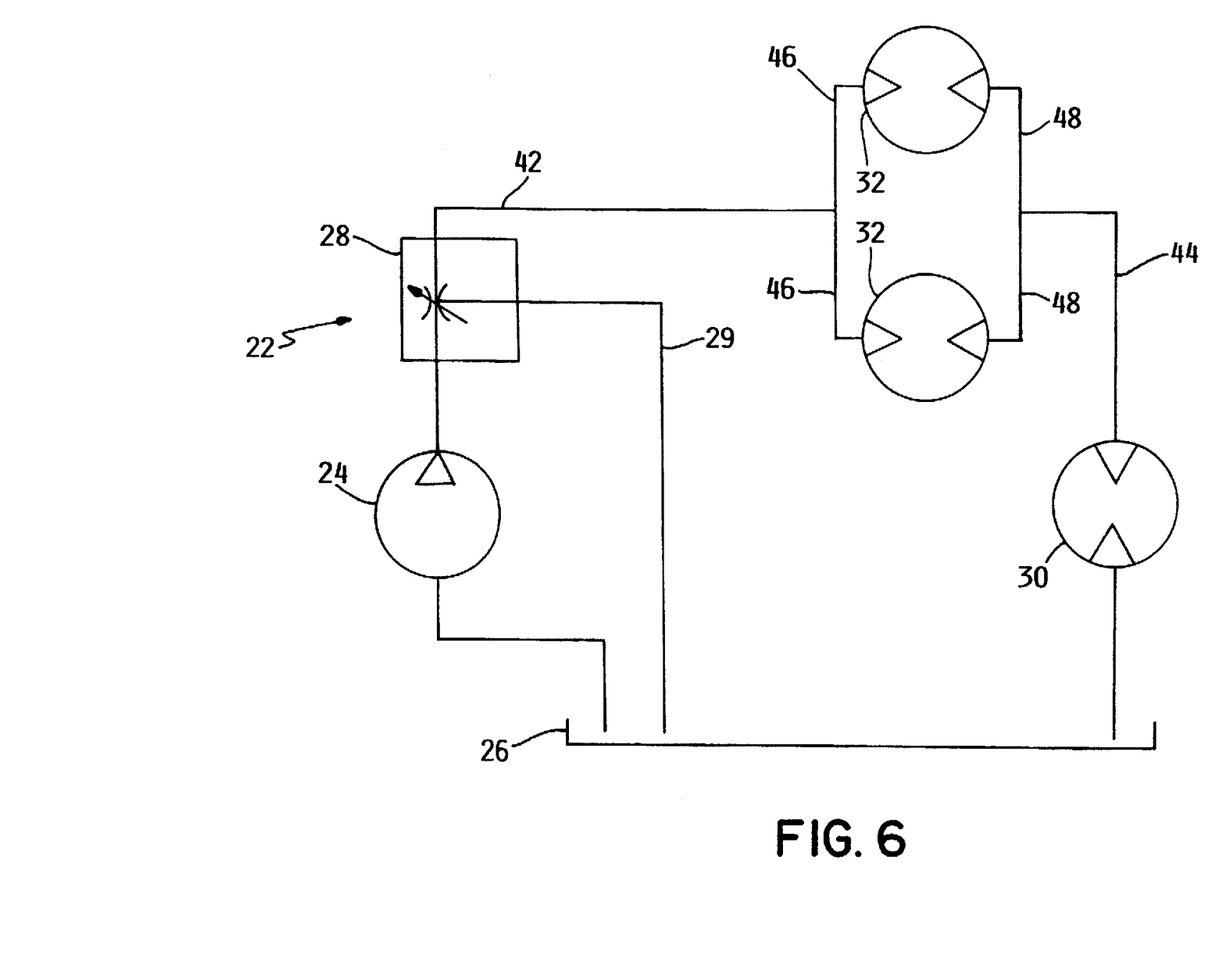
FIG. 6 is a schematic view of an embodiment of a hydraulic drive system according to this invention as applied to a three wheel vehicle which is similar to FIG. 2 but in which the positions of the wheel drive motors are reversed within the hydraulic flow circuit.

While the hydraulic flow circuit 40 shown in FIG. 2 serially connects rear wheel drive motor 30 between fluid source 22 and the subcircuit comprising the parallel front wheel drive motors 32, this could be reversed. Alternatively, circuit 40 could be designed such that the parallel front wheel drive motors 32 are first connected to fluid source 22 with the output lines 48 therefrom merging together to then be serially connected to the input of rear wheel drive motor 30. The output line to reservoir 26 would then be the line leading from the output of rear wheel drive motor 30. This alternative arrangement is depicted in FIG. 6. Such a reversed fluid supply circuit would function equally well for the purposes of this invention as the circuit shown in FIG. 2.

The primary advantage of the circuit shown in FIG. 2 is that the entire pressurized fluid flow from fluid source 22, for whatever level of pressure has been chosen by the operator through use of flow control valve 28, will always pass through the single drive motor comprising rear wheel drive motor 30, either before or after passing through the parallel subcircuit used to supply the two front wheel drive motors 32. Thus, when traversing over the face of a hill, if the uphill wheel in the two wheel parallel subcircuit begins to slip, thus potentially drawing off some of the fluid supply for the other front drive wheel 8, this has no effect on the fluid supply to rear drive wheel 10. Rear drive wheel 10 will always receive maximum tractive effort from fluid source 22 for a given pressurized fluid flow regardless of wheel slippage conditions on front drive wheels 8. For vehicle 2 to come to a stop, both the uphill front drive wheel 8 and rear drive wheel 10 must both simultaneously slip, and this is much more unlikely to happen.

In tests of hydraulic drive system 20 of this invention, it has been found that a riding vehicle 2 equipped with drive system 20 shown herein has superior climbing and traction ability. For example, a Reelmaster 216 type fairway mower would normally be expected to outclimb a Greensmaster 3100 type product, even if that Greensmaster were equipped with the all parallel three wheel drive system of the Reelmaster 216 type product, because of the bald tires on the Greensmaster and the less favorable weight distribution arising from its rear mounted engine. However, when a Greensmaster 3100 type mower was equipped with the serial/parallel drive system of this invention, it was found that such a mower would climb comparably to a Reelmaster 216, even with the Greensmaster's bald tires and rear mounted engine. Thus, a riding vehicle with the hydraulic drive system 20 of this invention exhibits much better traction ability than the same vehicle with a more conventional all parallel hydraulic drive system even when such a parallel system is employed to drive all three wheels.

While hydraulic drive system 20 illustrated in FIG. 2 offers improved traction ability as noted above, it presents a problem during turns. Because rear drive wheel 10 is constantly and serially driven by hydraulic flow circuit 40, the speed of such wheel 10 would normally be constant and would lack the normal differential action provided by an all parallel hydraulic drive system. Thus, during turns, rear drive wheel 10 would not be able to speed up as needed during the turn, thus causing rear drive wheel 10 to skid or drag across the ground during such turns.

Figure 4:
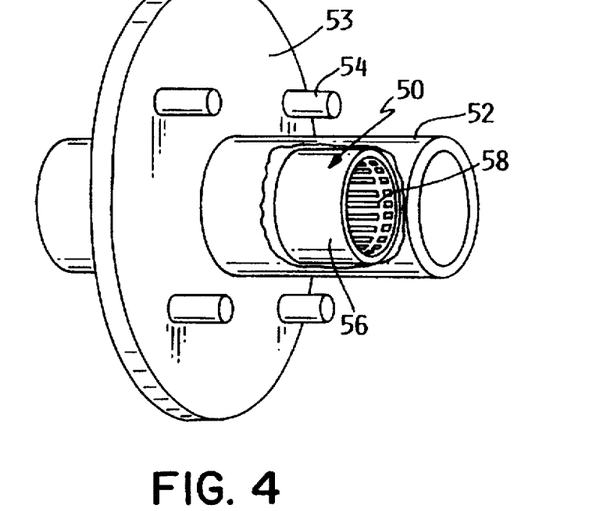
FIG. 4 is a perspective view of a portion of the first and second embodiments of the hydraulic drive system according to this invention, particularly illustrating an overrunning clutch used on certain drive wheels of the system.
Figure 5:
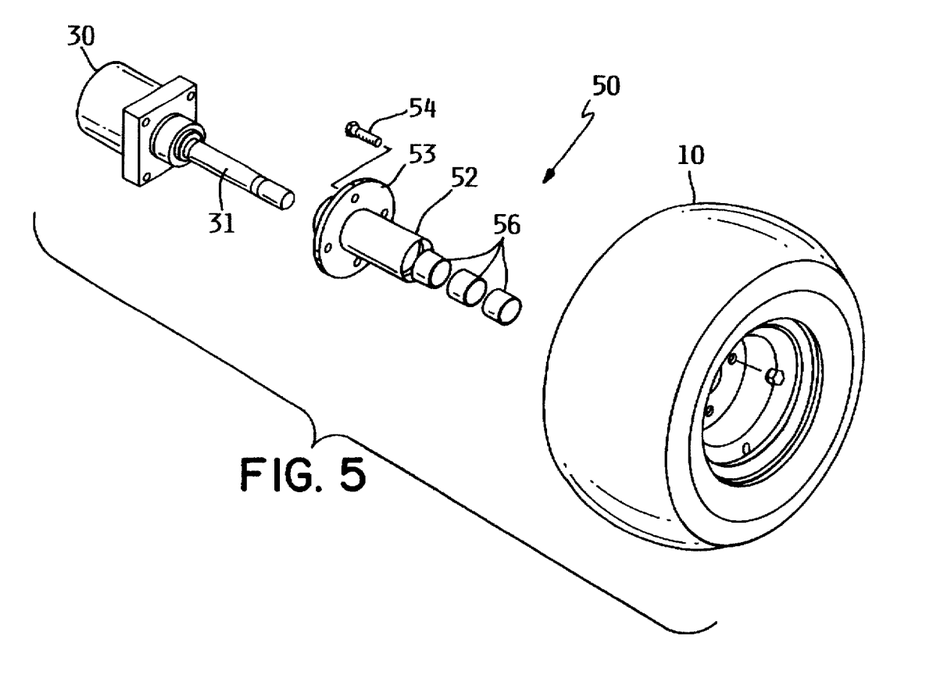
FIG. 5 is a partial, exploded view of a portion of the first and second embodiments of the hydraulic drive system according to this invention, particularly illustrating one of the drive wheels, the wheel hub, and the overrunning clutch of FIG. 4 used on such wheel hub.

Accordingly, it is preferred that hydraulic drive system 20 of this invention provide some simple and durable means for allowing rear wheel 10 to overrun during turns to increase its speed. One preferred means for accomplishing this is illustrated in FIGS. 4 and 5 by a mechanical overrunning clutch means 50, installed in the wheel hub 52 to rear drive wheel 10, for transferring torque to wheel hub 52 from the drive shaft 31 of rear wheel drive motor 30. Wheel hub 52 includes a flange 53 which may be secured by bolts 54 to rear wheel 10 in a known manner. Clutch means 50 is a unidirectional clutch transferring torque only in one direction of rotation of drive shaft 31, namely in the forward direction of motion for vehicle 2. Clutch means 50 does not drive vehicle 2 in a reverse direction when backing up, the drive from front wheels 8 being sufficient for that purpose.

The overrunning clutch means 50 comprises at least one roller clutch bearing 56 with a splined inner diameter 58 which normally grips the motor shaft. More than one such bearing 56 can be used in a stacked side-by-side configuration depending on how much torque must be transferred through clutch means 50. In FIG. 5, three such bearings 56 are shown being used, but this number could be larger or smaller. Roller clutch bearing 56 is generally known in the wheel art and may comprise a Model HFL3530 roller clutch bearing manufactured by the INA Bearing Company.

Clutch means 50 will release motor shaft 31 if rear wheel 10 starts to turn faster than motor shaft 31 to allow rear wheel 10 to speed up and overrun the shaft, as would occur during a turn of vehicle 2. When vehicle 2 straightens out after its turn, rear wheel 10 will slow down and the overrunning clutch 50 will become reengaged to reestablish drive to rear wheel 10 at the appropriate speed of motor shaft 31. Similar clutches 50 are not required in the hubs to front drive wheels 8 since they have a natural differential action arising from their parallel hydraulic connection to each other.

Hydraulic drive system 20 of this invention has been shown as being applied to a three wheeled vehicle having two front drive wheels 8 and a single steerable rear wheel 10. The invention could also be applied to a three wheel vehicle, such as the Sand Pro or Infield Pro which are also manufactured and sold by The Toro Company, having a single, steerable front wheel 8 and two rear drive wheels 10. In this application, the circuit of FIG. 2 would still apply except that the serially connected wheel drive motor 30 would be the front wheel drive motor and the parallel wheel drive motors 32 would those to the two rear drive wheels. In this application, overrunning clutch 50 would be used on hub 52 to the single front drive wheel 8.

Again, this type of vehicle would have superior climbing and traction ability as compared to a vehicle without it. In order for such a vehicle to lose traction so completely as to come to a stop, one of rear drive wheels 10 would have to slip and front drive wheel 8 would also have to slip as well. One would have to get slippage on at least one drive wheel on each end of vehicle 2. Again, this is unlikely to happen.

Figure 3:
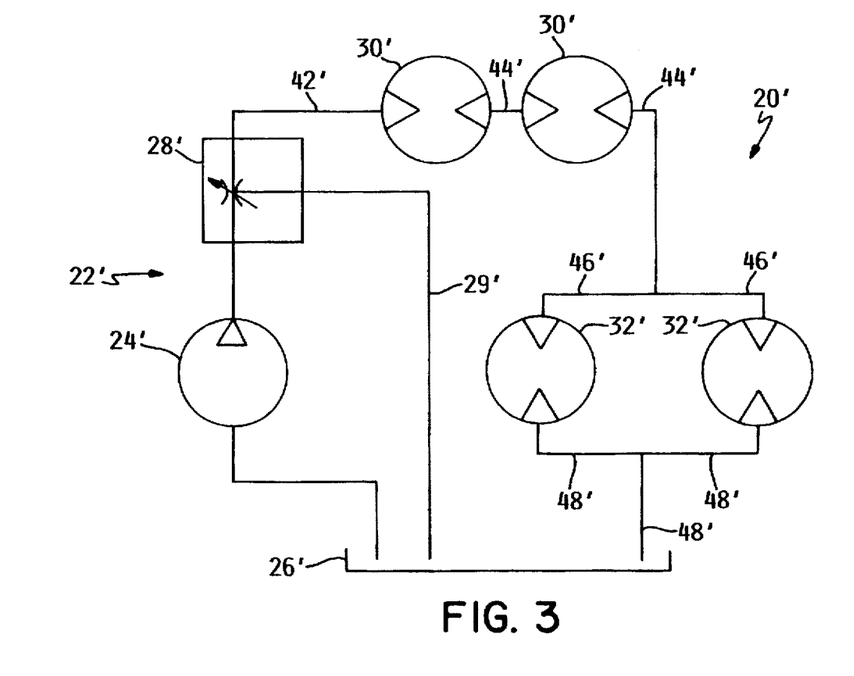
FIG. 3 is a schematic view of a second embodiment of a hydraulic drive system according to this invention as applied to a four wheel vehicle.

Referring now to FIG. 3, it should be apparent that hydraulic drive system 20 of this invention can also be applied to a four wheel, as opposed to a three wheel, vehicle. FIG. 3 is a schematic diagram of such a system 20' as applied to a four wheel vehicle having two front drive wheels 8' powered by two front wheel drive motors 32' and two rear wheels 10' powered by two rear wheel drive motors 30'. The same reference numerals used in FIG. 2 to refer to components will be used in FIG. 3 to refer to the same components with a prime designation being used to refer to those components in the second embodiment, e.g. drive System 20' in FIG. 3 as opposed to drive system 20 in FIG. 2.

The flow circuit 40' is much the same as in FIG. 2 comprising a serial/parallel connection with the front wheel drive motors 32' remaining in a parallel subcircuit. However, both of the individual rear wheel drive motors 30' are now serially connected to each other and to the parallel subcircuit supplying front wheel drive motors 32'. See FIG. 3. Thus, both rear wheel drive motors 30' get the full tractive effort being delivered by source 22' and both of the rear wheels 10' must spin, along with one of the front wheels 8', for the unit to come to a halt. In the application of FIG. 3, both rear wheel hubs would each be equipped with the overrunning clutch means 50 shown in FIGS. 4 and 5.

Various modifications of this invention will be apparent to those skilled in the art. For example, in the four wheel drive system 20' shown in FIG. 3, the two separate rear wheel drive motors 30' could be replaced by a single rear wheel drive motor 30' driving a solid rear axle that mounts rear wheels 10'. The overrunning clutch means 50 would still be used in the wheel hub to each rear wheel in this configuration to allow each rear wheel to overrun the axle, but the axle itself would not have any differential built into it. Thus, the term solid rear axle would apply to any arrangement of axle shafts, e.g. a single solid, transverse axle shaft directly extending between the rear wheels or a single, solid transverse axle shaft used to drive stub shafts that are connected to the rear wheels, which transfer torque from the single rear wheel drive motor 30' to each rear wheel without any differential being used in the axle. Accordingly, this invention is to be limited only by the appended claims.

We claim:

1. A hydraulically driven vehicle having all wheel drive, which comprises:
   (a) a frame having a power source thereon for supplying power;
   (b) a plurality of ground engaging wheels attached to the frame for movably supporting the frame for movement over the ground, the wheels comprising a first pair of wheels carried adjacent a first end of the frame and at least one wheel spaced on the frame from the first pair of wheels carried adjacent a second end of the frame; and
   (c) a hydraulic drive system for driving the ground engaging wheels of the frame, which drive system comprises:
      (i) a source of pressurized fluid which provides a pressurized fluid flow that is available for driving the ground engaging wheels;
      (ii) individual hydraulic drive motors operatively engaged to each of the ground engaging wheels of the frame; and
      (iii) means for connecting the hydraulic motors to the source of pressurized fluid in the following manner:

the wheel drive motor(s) for the wheel(s) on the second end of the frame being connected in series to the fluid source and to the wheel drive motors for the wheels on the first end of the frame in a manner that causes the pressurized fluid flow to pass substantially in its entirety through each wheel drive motor for each wheel on the second end of the frame to provide a maximum tractive effort on each wheel on the second end of the frame for a given pressurized fluid flow regardless of wheel slippage conditions on the wheels on the first end of the frame; and the wheel drive motors for the wheels on the first end of the frame being connected to each other in parallel in a manner that causes the pressurized fluid flow to be split when passing through the wheel drive motors for the wheels on the first end of the frame.

2. A vehicle as recited in claim 1, further including means operatively connected to the wheel(s) on the second end of the frame to allow such wheel(s) to overrun the hydraulic motors driving such wheel(s) when required during turns of the vehicle.

3. A vehicle as recited in claim 2, wherein such overrunning means comprises a mechanical clutch operatively connected between a drive shaft of each hydraulic motor driving each wheel(s) on the second end of the frame and a wheel hub of each wheel(s) on the second end of the frame.

4. A vehicle as recited in claim 3, wherein the clutch unidirectionally transmits torque from the drive shaft to the wheel hub(s).

5. A vehicle as recited in claim 1, wherein only a single wheel is carried on the second end of the frame to provide a tricycle wheel configuration on the frame.

6. A vehicle as recited in claim 5, wherein the first end of the frame is a front end of the frame, and the second end of the frame is a rear end of the frame, when the vehicle is travelling in a forward direction.

7. A vehicle as recited in claim 5, wherein the first end of the frame is a rear end of the frame, and the second end of the frame is a front end of the frame, when the vehicle is travelling in a forward direction.

8. A vehicle as recited in claim 1, wherein a pair of wheels is carried adjacent the second end of the frame to provide a four wheel configuration on the frame, and wherein the wheel drive motors for the wheels on the second end of the frame are connected in series to each other, to the fluid source, and to the wheel drive motors on the first end of the frame.

9. A hydraulically driven vehicle having all wheel drive, which comprises:
   (a) a frame having a power source thereon for supplying power;
   (b) a plurality of ground engaging wheels attached to the frame for movably supporting the frame for movement over the ground, the wheels comprising a first pair of wheels carried adjacent a first end of the frame and at least one wheel spaced on the frame from the first pair of wheels carried adjacent a second end of the frame;
   (c) a hydraulic drive system for driving the ground engaging wheels of the frame, which drive system comprises:
      (i) a source of pressurized fluid which provides a pressurized fluid flow that is available for driving the ground engaging wheels;
      (ii) individual hydraulic drive motors operatively engaged to each of the ground engaging wheels on the first end of the frame, and at least one individual hydraulic drive motor operatively engaged to the ground engaging wheel(s) on the second end of the frame; and (iii) means for connecting the hydraulic motors to the source of pressurized fluid in the following manner:

the wheel drive motor(s) for the wheel(s) on the second end of the frame being connected in series to the fluid source and to the wheel drive motors for the wheels on the first end of the frame in a manner that causes the pressurized fluid flow to pass substantially in its entirety through each wheel drive motor for the wheel(s) carried on the second end of the frame to provide a maximum tractive effort on each wheel on the second end of the frame for a given pressurized fluid flow regardless of wheel slippage conditions on the wheels on the first end of the frame; and the wheel drive motors for the wheels on the first end of the frame being connected to each other in parallel in a manner that causes the pressurized fluid flow to be split when passing through the wheel drive motors for the wheels on the first end of the frame; and (d) a separate, independent overrunning clutch means operatively connected to each wheel(s) on the second end of the frame for allowing each wheel(s) on the second end of the frame to independently overrun the hydraulic motor(s) driving such wheel(s) when required during turns of the vehicle.

10. A vehicle as recited in claim 9, wherein a pair of wheels are provided on the second end of the frame, wherein a single hydraulic motor is used to drive the pair of wheels carried on the second end of the frame through a solid axle, and wherein the independent overrunning clutch means comprises a clutch operatively connected between each end of the axle and a wheel hub of each wheel carried on the second end of the frame.

11. A hydraulically driven vehicle having all wheel drive, which comprises:

(a) a frame having a power source thereon for supplying power;

(b) a plurality of ground engaging wheels attached to the frame for movably supporting the frame for movement over the ground, the wheels comprising a first pair of wheels carried adjacent a first end of the frame and at least one wheel spaced on the frame from the first pair of wheels carried adjacent a second end of the frame; and (c) a hydraulic drive system for driving the ground engaging wheels of the frame, which drive system comprises:

(i) a source of pressurized fluid having a fluid outlet which provides a pressurized fluid flow that is available for driving the ground engaging wheels;

(ii) individual hydraulic drive motors operatively engaged to each of the ground engaging wheels of the frame, wherein the wheel drive motors each have a fluid inlet and a fluid outlet; and (iii) means for connecting the hydraulic motors to the source of pressurized fluid in the following manner:

the fluid outlet of the fluid source being connected in series to the fluid inlet(s) of the wheel drive motor(s) for the drive wheel(s) on the second end of the frame; and the fluid inlets of the wheel drive motors for the drive wheels on the first end of the frame being connected in parallel to the fluid outlet(s) of the wheel drive motor(s) for the drive wheel(s) on the second end of the frame, the fluid outlets of the wheel drive motors for the drive wheels on the first end of the frame being connected back to the fluid source.

12. A vehicle as recited in claim 11, further including means operatively connected to the wheel(s) on the second end of the frame to allow such wheel(s) to overrun the hydraulic motors driving such wheel(s) when required during turns of the vehicle.

13. A vehicle as recited in claim 12, wherein only a single wheel is carried on the second end of the frame to provide a tricycle wheel configuration on the frame.

14. A hydraulically driven vehicle having all wheel drive, which comprises:

(a) a frame having a power source thereon for supplying power;

(b) a plurality of ground engaging wheels attached to the frame for movably supporting the frame for movement over the ground, the wheels comprising a first pair of wheels carried adjacent a first end of the frame and at least one wheel spaced on the frame from the first pair of wheels carried adjacent a second end of the frame; and (c) a hydraulic drive system for driving the ground engaging wheels of the frame, which drive system comprises:

(i) a source of pressurized fluid having a fluid outlet which provides a pressurized fluid flow that is available for driving the ground engaging wheels;

(ii) individual hydraulic drive motors operatively engaged to each of the ground engaging wheels of the frame, wherein the wheel drive motors each have a fluid inlet and a fluid outlet; and (iii) means for connecting the hydraulic motors to the source of pressurized fluid in the following manner:

the fluid outlet of the fluid source being connected in parallel to the fluid inlets of the wheel drive motors for the drive wheels on the first end of the frame; and the fluid inlet(s) of the wheel drive motor(s) for the drive wheel(s) on the second end of the frame being connected in series to the fluid outlets of the wheel drive motors for the drive wheels on the first end of the frame, the fluid outlet(s) of the wheel drive motor(s) for the drive wheel(s) on the second end of the frame being connected back to the fluid source.

15. A vehicle as recited in claim 14, further including means operatively connected to the wheel(s) on the second end of the frame to allow such wheel(s) to overrun the hydraulic motors driving such wheel(s) when required during turns of the vehicle.

16. A vehicle as recited in claim 15, wherein only a single wheel is carried on the second end of the frame to provide a tricycle wheel configuration on the frame.

* * * * *

(12) EX PARTE REEXAMINATION CERTIFICATE (6673rd)
United States Patent
Sallstrom et al.

(10) Number: US 5,715,664 C1
(45) Certificate Issued: Feb. 24, 2009

(54) ALL WHEEL HYDRAULIC DRIVE SYSTEM

(75) Inventors: Steve A. Sallstrom, Minnetonka, MN (US); Gerald E. Gorman, Bloomington, MN (US); Joel M. Dunlap, Eden Prairie, MN (US)

(73) Assignee: The Toro Company, South Minneapolis, MN (US)

Reexamination Request:
No. 90/008,575, May 10, 2007

Reexamination Certificate for:
Patent No.: 5,715,664
Issued: Feb. 10, 1998
Appl. No.: 08/677,296
Filed: Jul. 9, 1996

Related U.S. Application Data (62) Division of application No. 08/192,022, filed on Feb. 3, 1994, now Pat. No. 5,533,325.

(51) Int. Cl.
*A01D 34/60* (2006.01)
*A01D 75/30* (2006.01)

(52) U.S. Cl. .................... 56/7; 56/11.8; 56/11.9; 180/212; 180/242

(58) Field of Classification Search .............. None
See application file for complete search history.

(56) References Cited

U.S. PATENT DOCUMENTS

| | | | |
|---|---|---|---|
| 2,953,164 A | 9/1960 | Haberland et al. | |
| 3,955,474 A | 5/1976 | Dunn | |
| 4,227,364 A | 10/1980 | Scherbring | |

FOREIGN PATENT DOCUMENTS

EP 0 547 947 A1 6/1993

OTHER PUBLICATIONS

Brochure, "Toro Greensmaster 3100," *The Toro Company*, 6 pgs. (1991).
Brochure, "Toro Reelmaster 355–D," *The Toro Company*, 4 pgs. (1990).
Brochure, "Fairway 5000 Mower," *Ransomes, Inc.*, 6 pgs. (1989).

*Primary Examiner*—Jeffrey R Jastrzab (57) ABSTRACT

An improved hydraulic drive system is provided for a vehicle having a plurality of ground engaging wheels which are each individually driven by a hydraulic motor to provide all wheel drive. The ground engaging wheels include a first pair of such wheels at or adjacent a first end of the vehicle and at least one other such wheel at or adjacent a second end of the vehicle. The hydraulic drive system includes a hydraulic flow circuit that connects the hydraulic motors for the wheel(s) at the second end of the vehicle in series to each other, to the fluid source, and to the drive motors for the wheels at the first end of the frame, which latter drive motors are connected in parallel to each other. Such a vehicle will provide superior traction ability as at least one wheel on each end of the vehicle must slip to bring the vehicle to a halt.

At the time of issuance and publication of this certificate, the patent remains subject to pending reexamination control number 90/009,224 filed Jul. 14, 2008. The claim content of the patent may be subsequently revised in the reexamination proceeding.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 and 9–16 is confirmed.

Claim 8 was not reexamined.

\* \* \* \* \*

(12) EX PARTE REEXAMINATION CERTIFICATE (7351st)
United States Patent
Sallstrom et al.

(10) Number: US 5,715,664 C2
(45) Certificate Issued: Feb. 2, 2010

(54) ALL WHEEL HYDRAULIC DRIVE SYSTEM

(75) Inventors: Steve A. Sallstrom, Minnetonka, MN (US); Gerald E. Gorman, Bloomington, MN (US); Joel M. Dunlap, Eden Prairie, MN (US)

(73) Assignee: The Toro Company, Minneapolis, MN (US)

Reexamination Request:
No. 90/009,224, Jul. 14, 2008

Reexamination Certificate for:
Patent No.: 5,715,664
Issued: Feb. 10, 1998
Appl. No.: 08/677,296
Filed: Jul. 9, 1996

Reexamination Certificate C1 5,715,664 issued Feb. 24, 2009

Related U.S. Application Data

(62) Division of application No. 08/192,022, filed on Feb. 3, 1994, now Pat. No. 5,533,325.

(51) Int. Cl.
*B60K 17/356* (2006.01)
*B60K 17/34* (2006.01)
*A01D 34/60* (2006.01)
*A01D 75/30* (2006.01)

(52) U.S. Cl. .................. 56/7; 56/11.8; 56/11.9; 180/212; 180/242

(58) Field of Classification Search .................. None
See application file for complete search history.

(56) References Cited

U.S. PATENT DOCUMENTS

| 765,434 | A | 7/1904 | Manly |
|---|---|---|---|
| 3,151,694 | A | 10/1964 | Rogers |
| 3,250,340 | A | 5/1966 | Roberson |
| 3,511,033 | A | 5/1970 | Strasel |
| 3,563,012 | A | 2/1971 | Strasel |
| 3,777,459 | A | 12/1973 | Elliott |
| 4,162,605 | A | 7/1979 | Olin et al. |
| 4,180,138 | A | 12/1979 | Shea |
| 4,185,713 | A | 1/1980 | Williams et al. |
| 5,199,525 | A | 4/1993 | Schueler |
| 5,261,213 | A | 11/1993 | Humphrey |
| 6,032,441 | A | 3/2000 | Gust et al. |

FOREIGN PATENT DOCUMENTS

| EP | 0 547 947 | 4/1995 |
|---|---|---|
| GB | 1335779 | 10/1973 |

OTHER PUBLICATIONS

Operator's Manual for Toro Reelmaster 3100–D, pp. 1, 2 and 27, dated 2005.
Brochure: The Reellmaster 335–D (1990), 4 pages.
Brochure: The Reelmaster 3500–D (1994), 4 pages.
Brochure: The Greensmaster 3100 (1991), 6 pages.
Brochure: The Ransomes Fairway 5000 (1989), 6 pages.
Manual: the Ransomes Fairway 5000 (1990), 44 pages.

*Primary Examiner*—Jeffrey R. Jastrzab (57) ABSTRACT

An improved hydraulic drive system is provided for a vehicle having a plurality of ground engaging wheels which are each individually driven by a hydraulic motor to provide all wheel drive. The ground engaging wheels include a first pair of such wheels at or adjacent a first end of the vehicle and at least one other such wheel at or adjacent a second end of the vehicle. The hydraulic drive system includes a hydraulic flow circuit that connects the hydraulic motors for the wheel(s) at the second end of the vehicle in series to each other, to the fluid source, and to the drive motors for the wheels at the first end of the frame, which latter drive motors are connected in parallel to each other. Such a vehicle will provide superior traction ability as at least one wheel on each end of the vehicle must slip to bring the vehicle to a halt.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–7 is confirmed.
Claims 9–16 are cancelled.
Claim 8 was not reexamined.

\* \* \* \* \*